US012771151B2

(12) United States Patent
Chou et al.

(10) Patent No.: US 12,771,151 B2
(45) Date of Patent: Oct. 20, 2026

(54) BATTERY BALANCING SYSTEM AND BATTERY BALANCING CONTROL METHOD

(71) Applicant: Richtek Technology Corporation, Hsinchu (TW)

(72) Inventors: Chung-Jen Chou, Taipei (TW); Chien-Chin Huang, Hsinchu (TW); Shih-Hsin Tseng, Hsinchu (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 665 days.

(21) Appl. No.: 18/357,141

(22) Filed: Jul. 23, 2023

(65) Prior Publication Data

US 2024/0079884 A1 Mar. 7, 2024

Related U.S. Application Data

(60) Provisional application No. 63/374,565, filed on Sep. 4, 2022.

(30) Foreign Application Priority Data

Nov. 30, 2022 (TW) ................................. 111145833

(51) Int. Cl.
*H02J 7/56* (2026.01)
*H02J 7/54* (2026.01)
*H02J 7/96* (2026.01)

(52) U.S. Cl.
CPC *H02J 7/56* (2026.01); *H02J 7/54* (2026.01); *H02J 7/96* (2026.01)

(58) Field of Classification Search
CPC ................... H02J 7/56; H02J 7/54; H02J 7/96
See application file for complete search history.

(56) References Cited

U.S. PATENT DOCUMENTS

2001/0019256 A1* 9/2001 Olsson ...................... H02J 7/54 320/118
2013/0002203 A1* 1/2013 Kuraishi .................. H02J 7/56 320/134

(Continued)

FOREIGN PATENT DOCUMENTS

CN 113728489 A 11/2021

OTHER PUBLICATIONS

KR 20200084710A—Apparatus for battery balancing, and battery pack including the same, 41 pages. (Year: 2026).*

(Continued)

*Primary Examiner* — Tuyen K Vo
(74) *Attorney, Agent, or Firm* — Winston Hsu

(57) ABSTRACT

A battery balancing system includes a voltage sensing unit, a characteristic voltage selector and a control unit. The voltage sensing unit senses a battery voltage of each of the batteries connected in series in a battery group and generates corresponding battery voltage sensing signals. The characteristic voltage selector generates a characteristic voltage according to the battery voltage sensing signals. The control unit compares the characteristic voltage with a threshold voltage in a balance operation mode, to adaptively adjust the threshold voltage, and compares the battery voltage sensing signal with the adjusted threshold voltage to generate a battery balancing command, thereby executing a charge removal balancing command or a charge supplying balancing command on the corresponding battery, or thereby cease executing the charge removal balancing command or cease executing the charge supplying balancing command on the corresponding battery.

32 Claims, 12 Drawing Sheets

(56) References Cited

U.S. PATENT DOCUMENTS

| | | | | |
|---|---|---|---|---|
| 2014/0265606 | A1* | 9/2014 | Gazit | H02J 3/32 307/82 |
| 2015/0214766 | A1* | 7/2015 | Shi | H02J 7/342 320/103 |
| 2017/0040808 | A1* | 2/2017 | Gong | H02J 7/54 |
| 2020/0099232 | A1 | 3/2020 | Parmar | |
| 2020/0185932 | A1* | 6/2020 | Parmar | H01M 10/425 |
| 2021/0203169 | A1* | 7/2021 | Tsai | H02J 7/52 |
| 2022/0329079 | A1* | 10/2022 | Hsu | H02J 7/52 |
| 2023/0335995 | A1* | 10/2023 | Brooker | H02J 3/32 |

OTHER PUBLICATIONS

KR 20220099020A—Battery Balancing System, 41 pages. (Year: 2026).*

Wang Chen et al., Title design of equalization control circuit in BMS, Electronic Design Engineering, Oct. 2020, p. 57-61, vol. 28, No. 20., Oct. 2020.

Saurabh Shah et al., A Practical Approach of Active Cell Balancing in a Battery Management System., IEEE, 2018.

* cited by examiner

BATTERY BALANCING SYSTEM AND BATTERY BALANCING CONTROL METHOD

CROSS REFERENCE

The present invention claims priority to U.S. 63/374,565 filed on Sep. 4, 2022 and claims priority to TW 111145833 filed on Nov. 30, 2022.

BACKGROUND OF THE INVENTION

Field of Invention

The present invention relates to a battery balancing system; particularly, it relates to such battery balancing system having a characteristic voltage. The present invention also relates to a battery balancing control method.

Description of Related Art

Conventional battery balancing control methods typically adopts a constant voltage threshold as a reference basis, wherein when a battery voltage is higher than the constant voltage threshold, the conventional battery balancing control method is actuated, to enter a balance operation mode. It is generally required for the conventional battery balancing control method to set the constant voltage threshold at a value which is close to a margin of the battery operation voltage range. However, batteries are often incompletely charged and discharged for many cycles, so the battery voltage will eventually hard to reach the constant voltage threshold, resulting in severe imbalance of the batteries to deteriorate the batteries or cause damages to the batteries. Additionally, during charging process for a battery, the battery voltage does not show the true electric quantity of the battery, because the level of the battery voltage varies dependent on the internal resistance of the battery and the charging current. Consequently and undesirably, if the actual battery voltage is misjudged and the balancing control is executed based on wrong information, it can cause even worse imbalance which will take a much longer time and more energy to recover to the correct state.

The following prior arts are relevant to the present invention: U.S. Pat. Nos. 10,971,939B2 and 10,608,442B1

In view of the above, to overcome the drawbacks in the prior art, the present invention proposes a battery balancing system and a battery balancing control method. Advantages of the present invention include: that the present invention can improve the balancing effect between batteries; and that the present invention can enhance safety and stability of the batteries, to prolong life of the batteries.

SUMMARY OF THE INVENTION

From one perspective, the present invention provides a battery balancing system, comprising: a voltage sensing unit, which is configured to operably sense a battery voltage of each of a plurality of batteries connected in series in a battery group and generate a plurality of corresponding battery voltage sensing signals; a characteristic voltage selector, which is configured to operably generate a characteristic voltage according to the plurality of battery voltage sensing signals; and a control unit, which is configured to operably compare the characteristic voltage with at least one threshold voltage in a balance operation mode, to adaptively adjust the at least one threshold voltage to generate at least one adjusted threshold voltage, and which is configured to operably compare at least one of the battery voltage sensing signals with the at least one adjusted threshold voltage to generate a battery balancing command, thereby executing a charge removal balancing command or a charge supplying balancing command on the corresponding battery, or thereby ceasing executing the charge removal balancing command or ceasing executing the charge supplying balancing command on the corresponding battery.

From another perspective, the present invention provides a battery balancing control method, comprising: sensing a battery voltage of each of a plurality of batteries connected in series in a battery group to generate a plurality of corresponding battery voltage sensing signals; generating a characteristic voltage according to the plurality of battery voltage sensing signals; and comparing the characteristic voltage with at least one threshold voltage in a balance operation mode, to adaptively adjust the at least one threshold voltage to generate at least one adjusted threshold voltage, and comparing the battery voltage sensing signal with the at least one adjusted threshold voltage to generate a battery balancing command, thereby executing a charge removal balancing command or a charge supplying balancing command on the corresponding battery, or thereby ceasing executing the charge removal balancing command or ceasing executing the charge supplying balancing command on the corresponding battery.

In one embodiment, when the characteristic voltage selector only operates in a charge removal battery balancing approach, the characteristic voltage is correlated with a lowest battery voltage sensing signal of the plurality of battery voltage sensing signals.

In one embodiment, the at least one threshold voltage is one single threshold voltage, wherein in a case wherein the characteristic voltage is not lower than the threshold voltage, the threshold voltage is adaptively elevated by adding the characteristic voltage with an adjustable step voltage.

In one embodiment, when the characteristic voltage selector only operates in a charge supplying battery balancing approach, the characteristic voltage is correlated with a highest battery voltage sensing signal of the plurality of battery voltage sensing signals.

In one embodiment, the at least one threshold voltage includes: an upper limit threshold and a lower limit threshold, wherein a difference between the upper limit threshold and the lower limit threshold is an adjustable step voltage, and wherein the characteristic voltage lies between the upper limit threshold and the lower limit threshold; wherein when the battery voltage sensing signal is lower than the lower limit threshold, the control unit decides that the corresponding battery balancing command is to execute the charge supplying balancing command on the corresponding battery; wherein when the battery voltage sensing signal lies between the upper limit threshold and the lower limit threshold, the control unit decides that the corresponding battery balancing command is to cease executing the charge removal balancing command or cease executing the charge supplying balancing command on the corresponding battery.

In one embodiment, in a case wherein the characteristic voltage is not lower than the upper limit threshold, the control unit adaptively elevates the upper limit threshold.

In one embodiment, in the case wherein the characteristic voltage is not lower than the upper limit threshold, the control unit subtracts the adjustable step voltage from the elevated upper limit threshold to obtain the lower limit threshold.

In one embodiment, when the characteristic voltage selector operates in a mixed battery balancing approach, the characteristic voltage lies between the highest battery voltage sensing signal and the lowest battery voltage sensing signal of the plurality of battery voltage sensing signals, wherein the mixed battery balancing approach includes: a charge removal battery balancing approach and a charge supplying battery balancing approach.

In one embodiment, the characteristic voltage is an average voltage of the highest battery voltage sensing signal and the lowest battery voltage sensing signal of the plurality of battery voltage sensing signals.

In one embodiment, the characteristic voltage is set so that a time required by the characteristic voltage to supply charges to the corresponding battery is substantially the same as a time required by the characteristic voltage to remove charges from the corresponding battery.

In one embodiment, the at least one threshold voltage includes: an upper limit threshold and a lower limit threshold, wherein a difference between the upper limit threshold and the lower limit threshold is an adjustable step voltage, and wherein the characteristic voltage lies between the upper limit threshold and the lower limit threshold; wherein when the battery voltage sensing signal is higher than the upper limit threshold, the control unit decides that the corresponding battery balancing command is to execute the charge removal balancing command on the corresponding battery; wherein when the battery voltage sensing signal is lower than the lower limit threshold, the control unit decides that the corresponding battery balancing command is to execute the charge supplying balancing command on the corresponding battery; wherein when the battery voltage sensing signal lies between the upper limit threshold and the lower limit threshold, the control unit decides that the corresponding battery balancing command is to cease executing the charge removal balancing command or cease executing the charge supplying balancing command on the corresponding battery.

In one embodiment, in a case wherein the characteristic voltage is not lower than the upper limit threshold, the control unit adaptively elevates the upper limit threshold.

In one embodiment, in the case wherein the characteristic voltage is not lower than the upper limit threshold, the control unit subtracts the adjustable step voltage from the elevated upper limit threshold to obtain the lower limit threshold.

In one embodiment, the characteristic voltage selector is configured to operably generate the characteristic voltage further according to a battery model.

In one embodiment, a starting time point of the balance operation mode is correlated with a time point at which each battery voltage sensing signal is not lower than a starting threshold, and wherein the balance operation mode includes a threshold voltage adjustment termination time point, wherein the threshold voltage adjustment termination time point is correlated with a time point at which the at least one threshold voltage is not lower than a fully-charged threshold.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
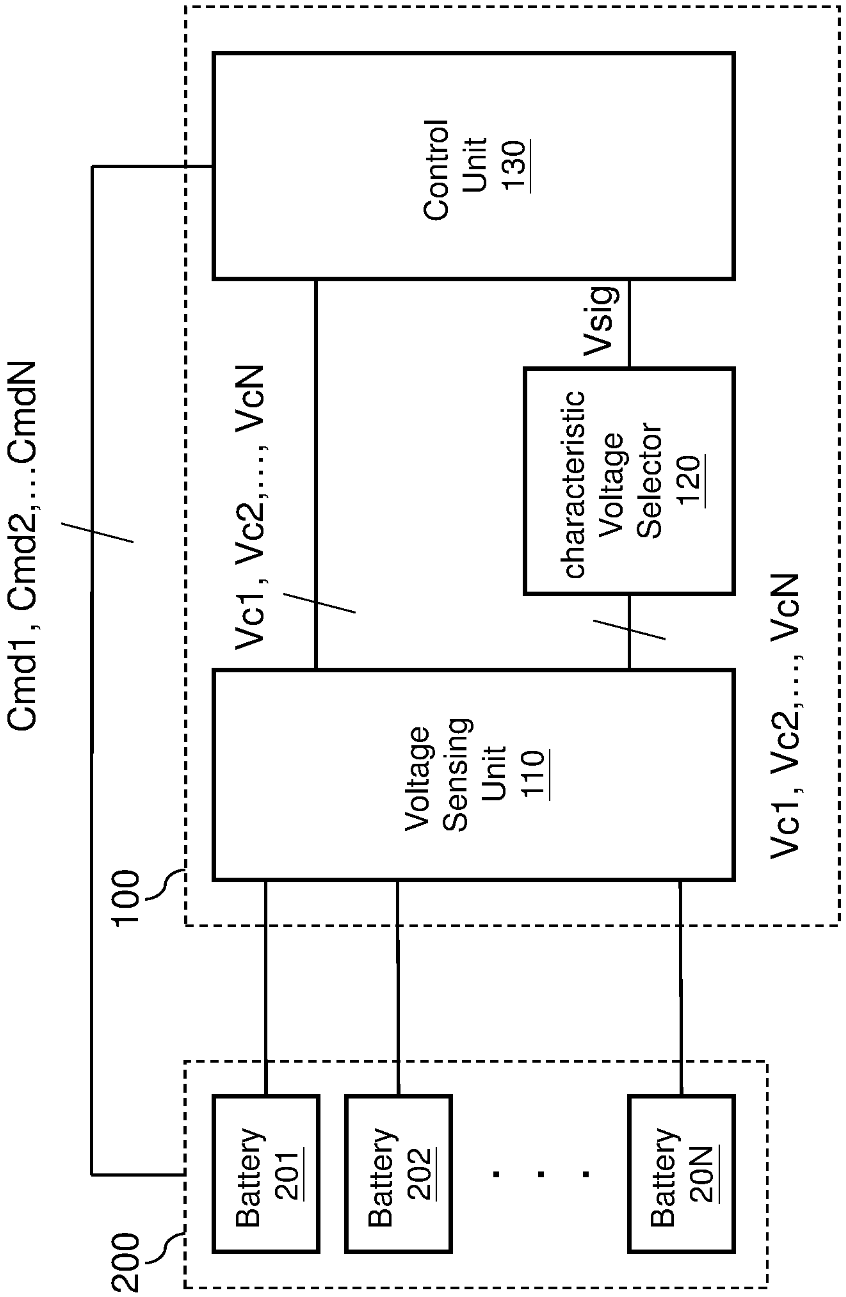
FIG. 1 shows a schematic module block diagram of a battery balancing system according to an embodiment of the present invention.

Please refer to FIG. 1, which shows a schematic module block diagram of a battery balancing system 100 according to an embodiment of the present invention. As shown in FIG. 1, the battery balancing system 100 comprises: a voltage sensing unit 110, a characteristic voltage selector 120 and a control unit 130, wherein the voltage sensing unit 110 is coupled to the characteristic voltage selector 120 and the control unit 130, while the characteristic voltage selector 120 is coupled to the control unit 130. In one embodiment, the voltage sensing unit 110 is coupled to a battery group 200, and the voltage sensing unit 110 is configured to operably sense the battery voltage of each of the plural batteries 201-20N connected in series in the battery group 200 to generate plural corresponding battery voltage sensing signals Vc1-VcN, wherein N is a positive integer greater than zero. The battery voltage sensing signals Vc1-VcN can be stored in a memory for further calculation or transmission. In one embodiment, the voltage sensing unit 110 includes: an analog-to-digital converter (ADC) and a multiplexer (MUX), for sensing voltage to generate a corresponding signal, wherein the structures and functions of the ADC and the MUX are well known to those skilled in the art, so the details thereof are not redundantly explained here.

In one embodiment, the characteristic voltage selector 120 is configured to operably generate a characteristic voltage Vsig according to the battery voltage sensing signals Vc1-VcN. In one embodiment, the characteristic voltage selector 120 is configured to operably generate the characteristic voltage Vsig further according to a battery model, wherein the battery model is correlated with one or more of the following parameters: charging/discharging current, voltage, temperature, internal resistance, capacity and/or aging degree of the battery group 200, whereby the battery model defines battery characteristics, estimates a charging state and a health state, develops an algorithm, optimizes system levels and real-time simulate battery management system, etc., which are well known to those skilled in the art, so the details thereof are not redundantly explained here.

The control unit 130 is configured to operably compare the characteristic voltage Vsig with at least one threshold voltage in a balance operation mode, to adaptively adjust the at least one threshold voltage. Besides, the control unit 130 is configured to operably compare each of the battery voltage sensing signals Vc1-VcN with the adjusted threshold voltage to generate corresponding battery balancing commands Cmd1-CmdN, thereby executing a corresponding charge removal balancing command or a corresponding charge supplying balancing command on each of the corresponding batteries 201-20N, or thereby ceasing executing the corresponding charge removal balancing command or the corresponding charge supplying balancing command on each of the corresponding batteries 201-20N.

Figure 2A:
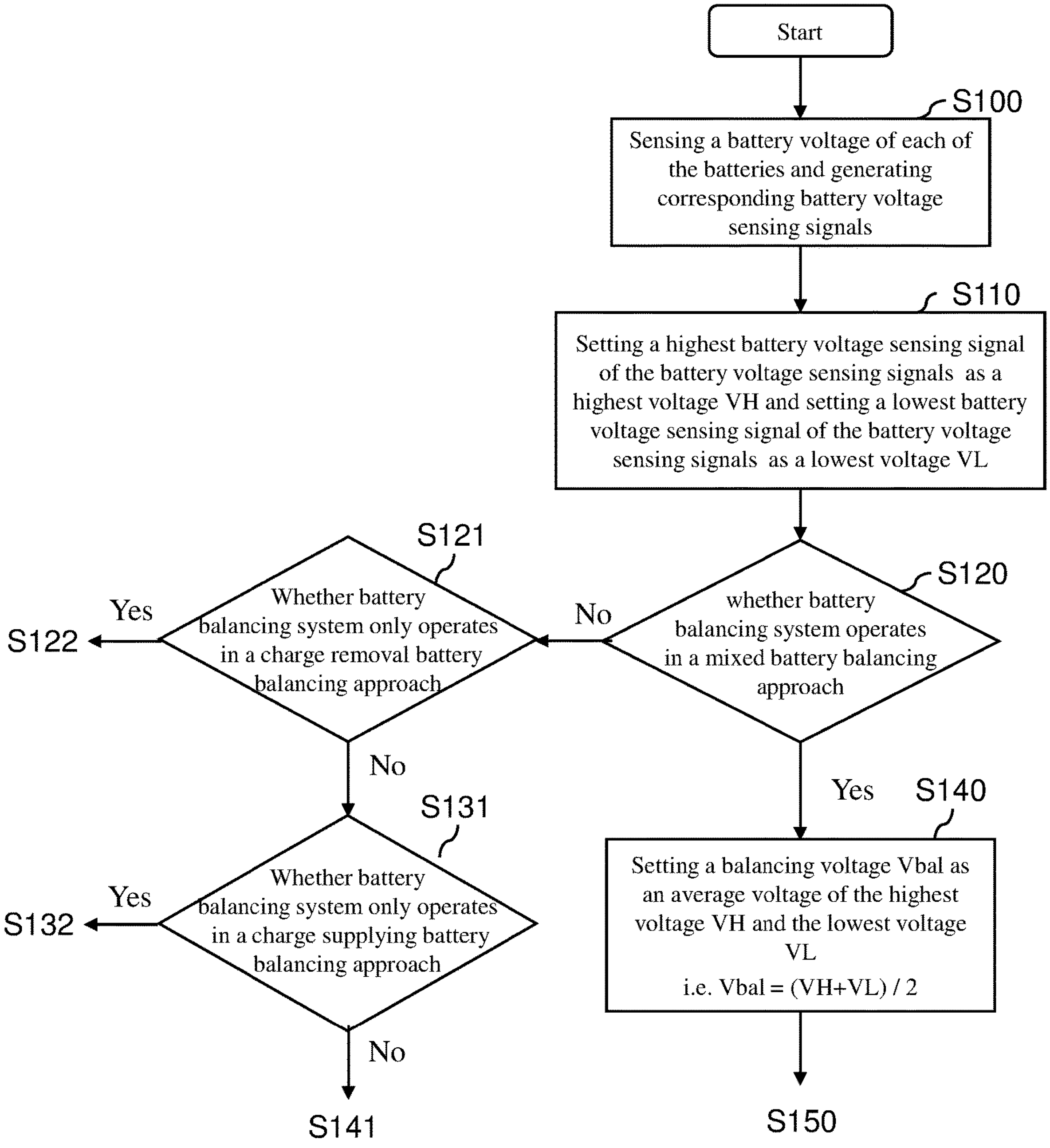
FIG. 2A shows an operation flow chart diagram depicting an operation procedure for generating a characteristic voltage Vsig in a battery balancing system according to an embodiment of the present invention.
Figure 2B:
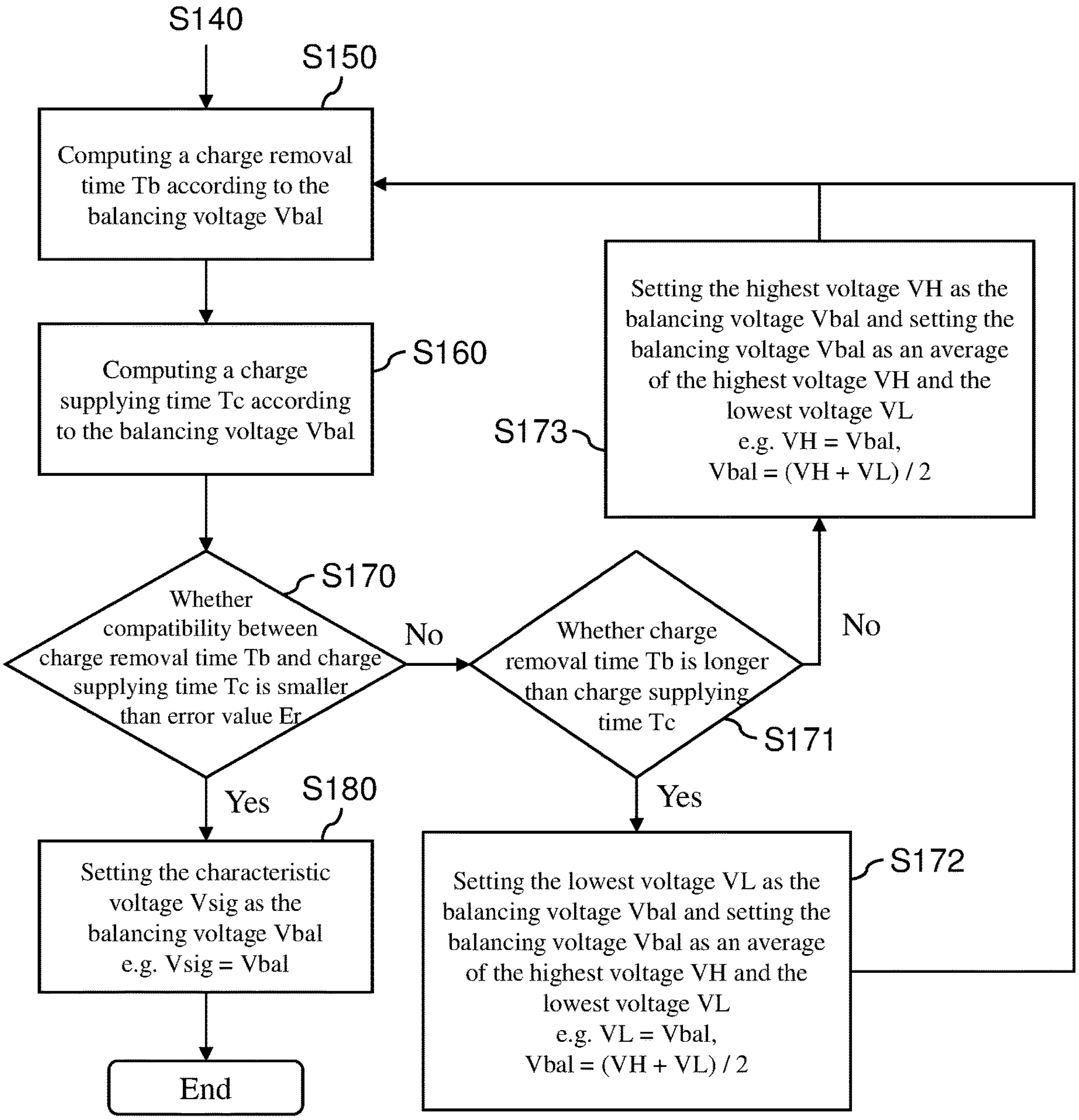
FIG. 2B shows an operation flow chart diagram depicting an operation procedure for generating a characteristic voltage Vsig in a battery balancing system according to an embodiment of the present invention.
Figure 2C:
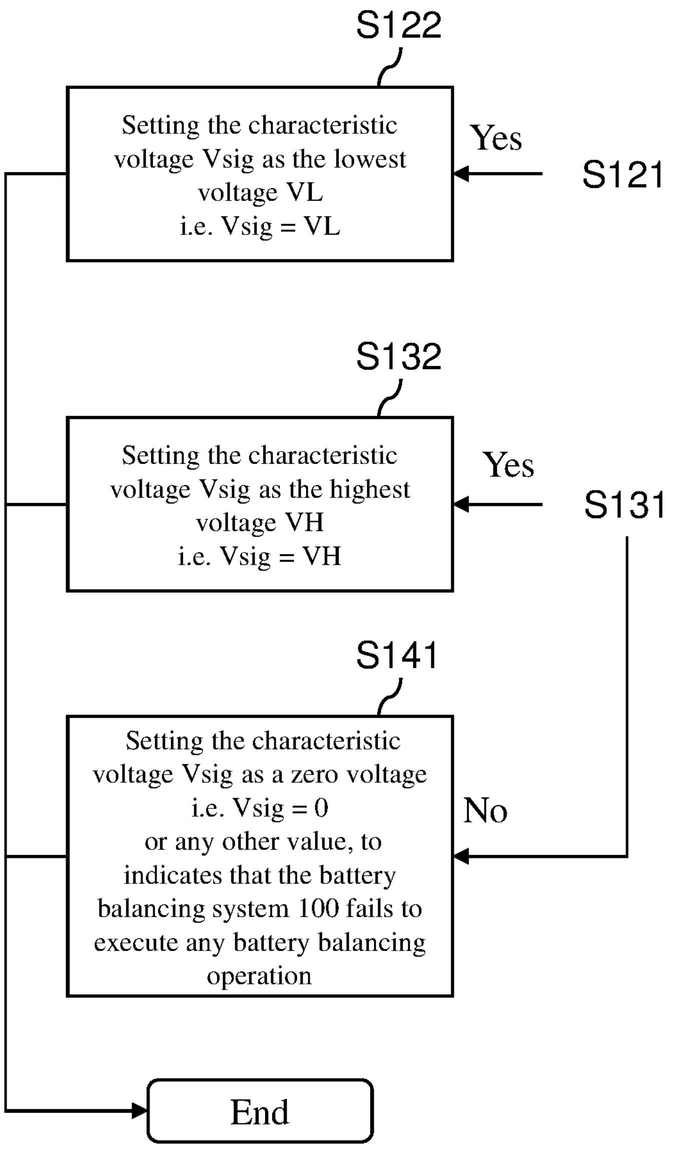
FIG. 2C shows an operation flow chart diagram depicting an operation procedure for generating a characteristic voltage Vsig in a battery balancing system according to an embodiment of the present invention.

Please refer to FIG. 2A, FIG. 2B and FIG. 2C. FIG. 2A, FIG. 2B and FIG. 2C show operation flow chart diagrams depicting an operation procedure for generating a characteristic voltage Vsig in a battery balancing system according to an embodiment of the present invention. As shown in FIG. 2A, when the battery balancing system 100 operates in a balance operation mode, the voltage sensing unit 110 of the battery balancing system 100 senses a battery voltage of each of the plural batteries 201-20N connected in series in the battery group 200 and generate plural corresponding battery voltage sensing signals Vc1-VcN (step S100). The highest battery voltage sensing signal of the battery voltage sensing signals Vc1-VcN is set as a highest voltage VH and the lowest battery voltage sensing signal of the battery voltage sensing signals Vc1-VcN is set as a lowest voltage VL (step S110). Next, it is determined whether the battery balancing system 100 operates in a mixed battery balancing approach (step S120). If the battery balancing system 100 operates in the mixed battery balancing approach, the characteristic voltage selector 120 will set a balancing voltage Vbal as an average voltage of the highest voltage VH and the lowest voltage VL (step S140). If the battery balancing system 100 does not operate in the mixed battery balancing approach, it is further determined whether the battery balancing system 100 only operates in a charge removal battery balancing approach (step S121). If the battery balancing system 100 does not only operate in a charge removal battery balancing approach, it is further determined whether the battery balancing system 100 only operates in a charge supplying battery balancing approach (step S131).

As shown in FIG. 2B, subsequent to the aforementioned step S140, the characteristic voltage selector 120 computes a charge removal time factor Tb according to the balancing voltage Vbal (step S150) and computes a charge supplying time factor Tc according to the balancing voltage Vbal (step S160), wherein the charge removal time factor Tb indicates a time required to adjust the highest voltage VH of the plural battery voltage sensing signals Vc1-VcN to the balancing voltage Vbal, whereas, the charge supplying time factor Tc indicates a time required to adjust the lowest voltage VL of the plural battery voltage sensing signals Vc1-VcN to the balancing voltage Vbal. In one embodiment, in a case wherein the batteries do not vary too large among each other with respect to their characteristics, the variation of the battery voltage is substantially proportional to the variation of the battery charge quantity. Hence, the charge removal time factor Tb is proportional to a difference of the highest voltage VH minus the balancing voltage Vbal and the charge removal time factor Tb is inversely proportional to a charge removal current Ib which removes charges from the battery, as indicated by formula 1:

$$Tb \propto (VH - V\text{bal})/Ib \quad \text{formula 1}$$

The charge supplying time factor Tc is proportional to a difference of the balancing voltage Vbal minus the lowest voltage VL and the charge supplying time factor Tc is inversely proportional to a charge supplying current Ic which supplies charges to the battery, as indicated by formula 2:

$$Tc \propto (V\text{bal} - VL)/Ic \quad \text{formula 2}$$

It should be understood that the charge removal time factor Tb derived by formula 1 and the charge supplying time factor Tc derived by formula 2 in the above-mentioned preferred embodiment is only an illustrative example, but not for limiting the broadest scope of the present invention. In other embodiments, it is also practicable and within the broadest scope of the present invention that the charge removal time factor Tb and the charge supplying time factor Tc can be computed further in accordance with a battery model, for even better accuracy.

Subsequent to the computations of the charge removal time factor Tb and the charge supplying time factor Tc, the characteristic voltage selector 120 determines whether a compatibility between the charge removal time factor Tb and the charge supplying time factor Tc is within an error range, i.e., smaller than an value Er (step S170), wherein the step S170 is executed according to formula 3:

$$|Tb - Tc|/(Tb + Tc) < Er \quad \text{formula 3}$$

If the characteristic voltage selector 120 determines that the compatibility between the charge removal time factor Tb and the charge supplying time factor Tc is smaller than the error value Er, it indicates that a balance is reached between the charge removal time factor Tb and the charge supplying time factor Tc. In this case, the characteristic voltage selector 120 will set the characteristic voltage Vsig as the balancing voltage Vbal (step S180) and the operation procedure for generating the characteristic voltage Vsig ends. If the characteristic voltage selector 120 determines that the compatibility between the charge removal time factor Tb and the charge supplying time factor Tc is not smaller than the error value Er, it indicates that the selected characteristic voltage Vsig still fails to achieve a balance between the charge removal time factor Tb and the charge supplying time factor Tc. In this case, the characteristic voltage selector 120 will further determine whether the charge removal time factor Tb is larger than the charge supplying time factor Tc (step S171). If the characteristic voltage selector 120 determines that the charge removal time factor Tb is larger than the charge supplying time factor Tc, the characteristic voltage selector 120 will set the lowest voltage VL as the balancing voltage Vbal and the characteristic voltage selector 120 will set the balancing voltage Vbal as an average of the highest voltage VH and the lowest voltage VL (step S172). If the characteristic voltage selector 120 determines that the charge removal time factor Tb is not larger than the charge supplying time factor Tc, the characteristic voltage selector 120 will set the highest voltage VH as the balancing voltage Vbal and the characteristic voltage selector 120 will set the balancing voltage Vbal as an average of the highest voltage VH and the lowest voltage VL (step S173). Subsequent to the step S172 and the step S173, the characteristic voltage selector 120 will repeat the step S150, to adjust the charge removal time factor Tb and the charge supplying time factor Tc, and repeat the steps subsequent to the step S150, until a selected characteristic voltage Vsig is able to achieve a balance between the charge removal time factor Tb and the charge supplying time factor Tc, whereby an optimum characteristic voltage Vsig is obtained. In one embodiment, when the characteristic voltage selector 120 operates in a mixed battery balancing approach, the characteristic voltage Vsig lies between the highest battery voltage sensing signal (i.e., highest voltage VH) and the lowest battery voltage sensing signal (i.e., lowest voltage VL) of the battery voltage sensing signals Vc1-VcN. In one embodiment, the characteristic voltage Vsig is an average voltage of the highest battery voltage sensing signal (i.e., highest voltage VH) and the lowest battery voltage sensing signal (i.e., lowest voltage VL) of the battery voltage sensing signals Vc1-VcN (referring to the formulas in steps S140 and S180).

It is worthwhile noting that, when the battery balancing system 100 operates in a mixed battery balancing approach, this embodiment determines the characteristic voltage Vsig by the steps S150, S160, S170, S171, S172, S173 and S180 by for example binary search. The purpose for selecting the characteristic voltage Vsig by the aforementioned way is to balance (to substantially make equal) the time of supplying charges to the corresponding battery and the time of removing charges from the corresponding battery, that is, so that the charges supplying and charges removal operations end at about the same time, so that a balance can be reached in a shortest time.

As shown in FIG. 2C, subsequent to the step S121, when the battery balancing system 100 only operates in a charge removal battery balancing approach, the characteristic voltage selector 120 sets the characteristic voltage Vsig as the lowest voltage VL (step S122) and the operation procedure for setting the characteristic voltage Vsig ends. Subsequent to the step S131, when the battery balancing system 100 only operates in a charge supplying battery balancing approach, the characteristic voltage selector 120 sets the characteristic voltage Vsig as the highest voltage VH (step S132) and the operation procedure for setting the characteristic voltage Vsig ends. If not, it indicates that the battery balancing system 100 cannot operates in the following three battery balancing approaches: mixed battery balancing approach, charge removal battery balancing approach and charge supplying battery balancing approach. That is, the battery balancing system 100 fails to execute any battery balancing operation. In this case, the characteristic voltage selector 120 sets the characteristic voltage Vsig as a zero voltage or any other value, to indicate that the battery balancing system 100 cannot execute any battery balancing operation. The mixed battery balancing approach includes the charge removal battery balancing approach and the charge supplying battery balancing approach.

Figure 3B:
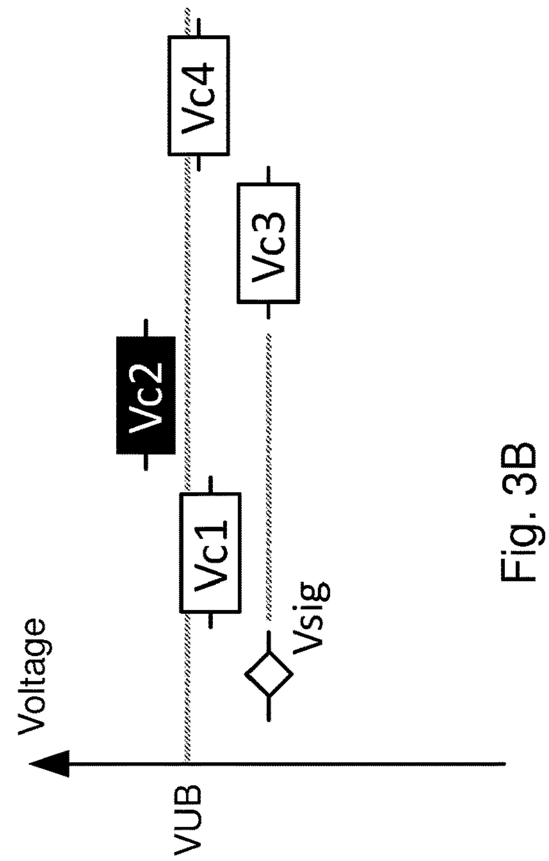
FIG. 3A to FIG. 3D respectively show levels of the battery voltage sensing signal when a battery is being charged according to several embodiments of the present invention.
Figure 3A:
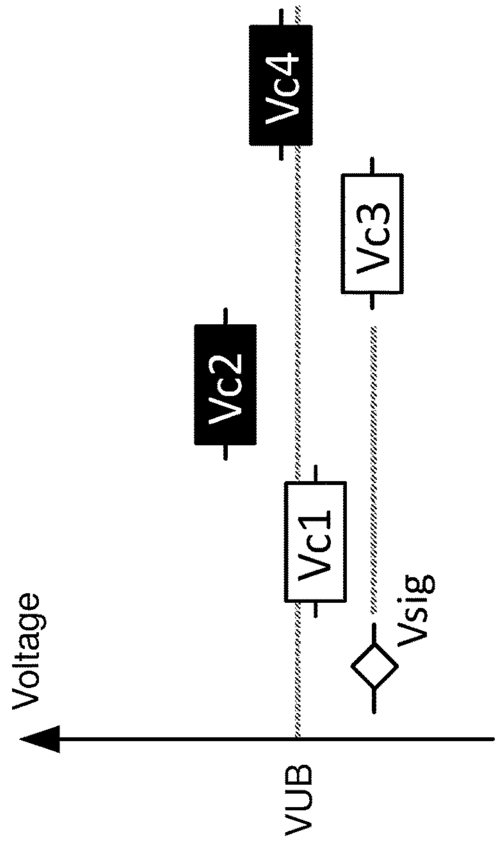

Please refer to FIG. 3A and FIG. 3B. FIG. 3A to FIG. 3B show levels of battery voltage sensing signals Vc1-Vc4 when a battery group 200 is being charged according to the present invention, wherein FIG. 3B occurs later than FIG. 3A, so the levels of the voltages shown in FIG. 3B is higher than the levels of the corresponding voltages shown in FIG. 3A. As shown in FIG. 3A and FIG. 3B, in this embodiment, because the battery balancing system 100 operates in the charge removal battery balancing approach, the characteristic voltage Vsig is set as the lowest battery voltage sensing signal (i.e., battery voltage sensing signals Vc3) of the battery voltage sensing signals Vc1-Vc4. Note that, the battery voltage sensing signals Vc1, Vc2, Vc3 and Vc4 are corresponding to batteries 201, 202, 203 and 204 respectively. And, in this embodiment, the at least one threshold voltage is one single threshold voltage (i.e., the upper limit threshold VUB). In this embodiment, the threshold voltage (i.e., upper limit threshold VUB) is generated by, at a time point when setting the characteristic voltage Vsig as the lowest battery voltage sensing signal (i.e., battery voltage sensing signals Vc3) of the battery voltage sensing signals Vc1-Vc4, adding an adjustable step voltage onto the characteristic voltage Vsig at this time point to generate the threshold voltage (i.e., upper limit threshold VUB in this case). In one embodiment, in a case wherein the characteristic voltage Vsig is gradually increased to a level which is not lower than the upper limit threshold VUB, for example, the characteristic voltage Vsig of FIG. 3A is increased to the characteristic voltage Vsig of FIG. 3B, whereat the characteristic voltage Vsig is not lower than (e.g., equal to) the upper limit threshold VUB of FIG. 3A, the control unit 130 adaptively elevates the upper limit threshold VUB (e.g., the control unit 130 adaptively elevates the upper limit threshold VUB of FIG. 3A to the upper limit threshold VUB of FIG. 3B).

Please refer to FIG. 3A. In one embodiment, in a case wherein the battery voltage sensing signals Vc2 and Vc4 are higher than the upper limit threshold VUB, it indicates that the difference between the battery voltage sensing signal Vc2 and the characteristic voltage Vsig and the difference between the battery voltage sensing signal Vc4 and the characteristic voltage Vsig are relatively large. In this case, when the battery group 200 is still under charging, the control unit 130 executes a charge removal balancing command on the corresponding batteries 202 and 204, so that rising speeds of the battery voltage sensing signals Vc2 and Vc4 become slower, whereby the battery voltage sensing signals Vc2 and Vc4 gradually approximate to the characteristic voltage Vsig. In one embodiment, in a case wherein the battery voltage sensing signals Vc1 and Vc3 are lower than the upper limit threshold VUB, it indicates that the difference between the battery voltage sensing signal Vc1 and the characteristic voltage Vsig and the difference between the battery voltage sensing signal Vc3 and the characteristic voltage Vsig are relatively small. In this case, the control unit 130 ceases executing a charge removal balancing command on the corresponding batteries 201 and 203, so that the rising speeds of the battery voltage sensing signals Vc1 and Vc3 are kept normal.

Please refer to FIG. 3B. In one embodiment, when the battery group 200 is still under charging, because the control unit 130 executes a charge removal balancing command on the corresponding batteries 202 and 204, the rising speeds of the battery voltage sensing signals Vc2 and Vc4 become slower. When the control unit 130 adaptively elevates the upper limit threshold VUB, the battery voltage sensing signal Vc4 becomes lower than the upper limit threshold VUB, and the difference between the battery voltage sensing signal Vc4 and the characteristic voltage Vsig becomes smaller. As a result, in this case, the control unit 130 ceases executing the charge removal balancing command on the corresponding battery 204, so that the rising speed of the battery voltage sensing signal Vc4 restores to normal. It is worthwhile noting that, in this embodiment, because the characteristic voltage Vsig is set as the lowest battery voltage sensing signal of the battery voltage sensing signals Vc1-Vc4, as the charging time of the battery group 200 goes by, the characteristic voltage Vsig increases as the lowest battery voltage sensing signal of the battery voltage sensing signals Vc1-Vc4 increases.

Figure 3D:
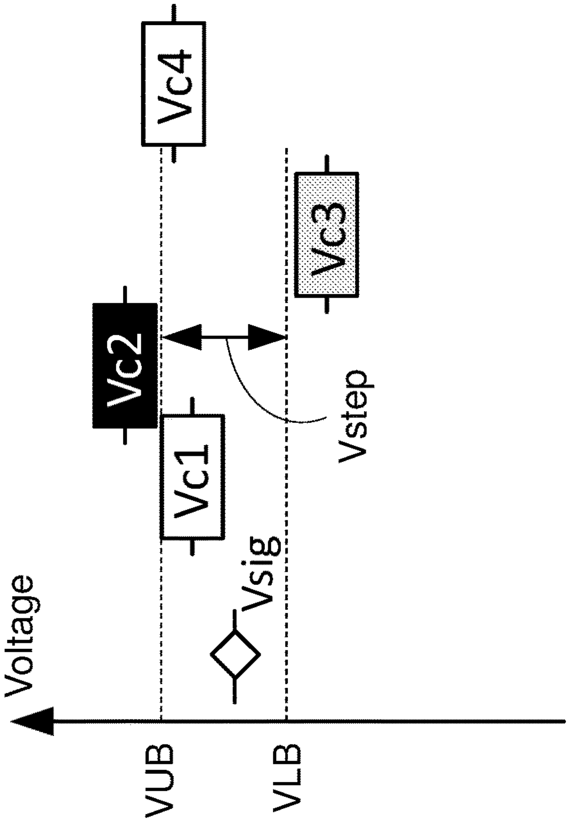
Figure 3C:
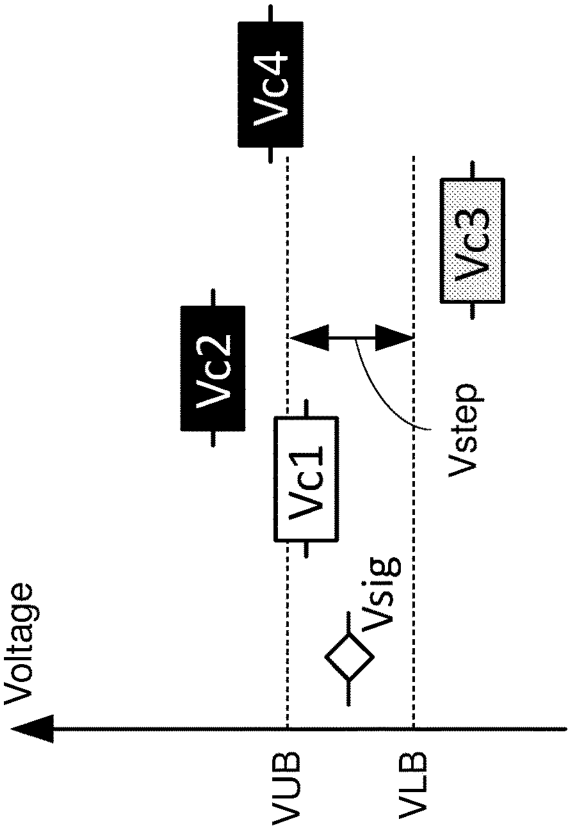

Please refer to FIG. 3C and FIG. 3D. FIG. 3C to FIG. 3D show levels of the battery voltage sensing signals Vc1-Vc4 when a battery group 200 is being charged according to the present invention, wherein FIG. 3D occurs later than FIG. 3C, so the levels of the voltages shown in FIG. 3D is higher than the levels of the corresponding voltages shown in FIG. 3C. As shown in FIG. 3C and FIG. 3D, in this embodiment, because the battery balancing system 100 operates in a mixed battery balancing approach, the characteristic voltage Vsig is set as an average voltage of the highest battery voltage sensing signal (i.e., battery voltage sensing signals Vc2) and the lowest battery voltage sensing signal (i.e., battery voltage sensing signals Vc3) of the battery voltage sensing signals Vc1-Vc4, or the characteristic voltage Vsig is set to be able to make a time required to supply charges to the corresponding battery to be substantially the same as a time required to remove charges from the corresponding battery. Besides, in this embodiment, the at least one threshold voltage includes an upper limit threshold VUB and a lower limit threshold VLB, wherein a difference between the upper limit threshold VUB and the lower limit threshold VLB is an adjustable step voltage Vstep. And, the characteristic voltage Vsig (i.e., the characteristic voltage Vsig at a time point when the upper limit threshold VUB and the lower limit threshold VLB are initially set) lies between the upper limit threshold VUB and the lower limit threshold VLB. In one embodiment, in a case wherein the characteristic voltage Vsig is gradually increased to a level which is not lower than the upper limit threshold VUB, for example, the characteristic voltage Vsig of FIG. 3C is increased to the characteristic voltage Vsig of FIG. 3D, the control unit 130 adaptively elevates the upper limit threshold VUB (e.g., the control unit 130 adaptively elevates the upper limit threshold VUB of FIG. 3C to the upper limit threshold VUB of FIG. 3D), and the control unit 130 subtracts the adjustable step voltage Vstep from the elevated upper limit threshold VUB to obtain the lower limit threshold VLB.

Please refer to FIG. 3C. In one embodiment, in a case wherein the battery voltage sensing signals Vc2 and Vc4 are higher than the upper limit threshold VUB, it indicates that the difference between the battery voltage sensing signal Vc2 and the characteristic voltage Vsig and the difference between the battery voltage sensing signal Vc4 and the characteristic voltage Vsig are relatively large. In this case, when the battery group 200 is still under charging, the control unit 130 executes a charge removal balancing command on the corresponding batteries 202 and 204, so that rising speeds of the battery voltage sensing signals Vc2 and Vc4 become slower, whereby the battery voltage sensing signals Vc2 and Vc4 gradually approximate to the characteristic voltage Vsig. In one embodiment, in a case wherein the battery voltage sensing signal Vc3 is lower than the lower limit threshold VLB, it indicates that the difference between the battery voltage sensing signal Vc3 and the characteristic voltage Vsig is relatively large. In this case, when the battery group 200 is still under charging, the control unit 130 executes a charge supplying balancing command on the corresponding battery 203, so that the rising speed of the battery voltage sensing signal Vc3 becomes faster, whereby the battery voltage sensing signal Vc3 gradually approximates to the characteristic voltage Vsig. In one embodiment, in a case wherein the battery voltage sensing signal Vc1 lies between the upper limit threshold VUB and the lower limit threshold VLB, it indicates that the difference between the battery voltage sensing signal Vc1 and the characteristic voltage Vsig is relatively small. In this case, the control unit 130 ceases executing a charge removal balancing command or a charge supplying balancing command on the corresponding battery 201, so that the rising speed of the battery voltage sensing signal Vc1 is kept normal.

Please refer to FIG. 3D. In one embodiment, because the control unit 130 executes a charge removal balancing command on the corresponding battery 202 and the corresponding battery 204, the rising speeds of the battery voltage sensing signals Vc2 and Vc4 become relatively slower. When the control unit 130 adaptively elevates the upper limit threshold VUB, and when the battery voltage sensing signal Vc4 becomes lower than the upper limit threshold VUB, the difference between the battery voltage sensing signal Vc4 and the characteristic voltage Vsig becomes relatively small. In this case, the control unit 130 ceases executing the charge removal balancing command on the corresponding battery 204, so that the rising speed of the battery voltage sensing signal Vc4 restores to normal. It is worthwhile noting that, in this embodiment, because the characteristic voltage Vsig is set as an average voltage of the highest battery voltage sensing signal (i.e., battery voltage sensing signals Vc2) and the lowest battery voltage sensing signal (i.e., battery voltage sensing signals Vc3) of the battery voltage sensing signals Vc1-Vc4, as the charging time of the battery group 200 goes by, the characteristic voltage Vsig increases as the average voltage increases.

In one embodiment, a starting time point of the balance operation mode is correlated with a time point at which each battery voltage sensing signal is not lower than a starting threshold VST. The balance operation mode includes a threshold voltage adjustment termination time point, wherein the threshold voltage adjustment termination time point is correlated with a time point at which the at least one threshold voltage is not lower than a fully-charged threshold VFC. The starting threshold VST and the fully-charged threshold VFC are correlated with stages in a charging process of the battery group 200. For example, the starting threshold VST is higher than a voltage of a flat voltage stage of the battery group 200, whereas, the fully-charged threshold VFC is not higher than a voltage of the battery group 200 when the charging of the battery group 200 is accomplished. The flat voltage stage of the battery group 200 is one of the stages in a charging process of the battery group 200, which is well known to those skilled in the art, so the details thereof are not redundantly explained here.

Figure 4A:
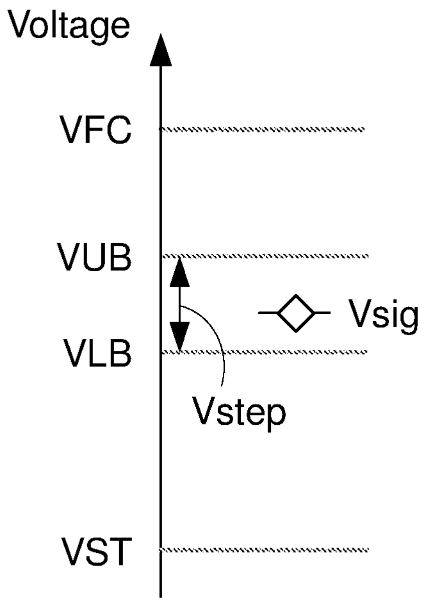
FIG. 4A shows a schematic diagram depicting levels of respective voltages in a battery balancing system according to an embodiment of the present invention.
Figure 4B:
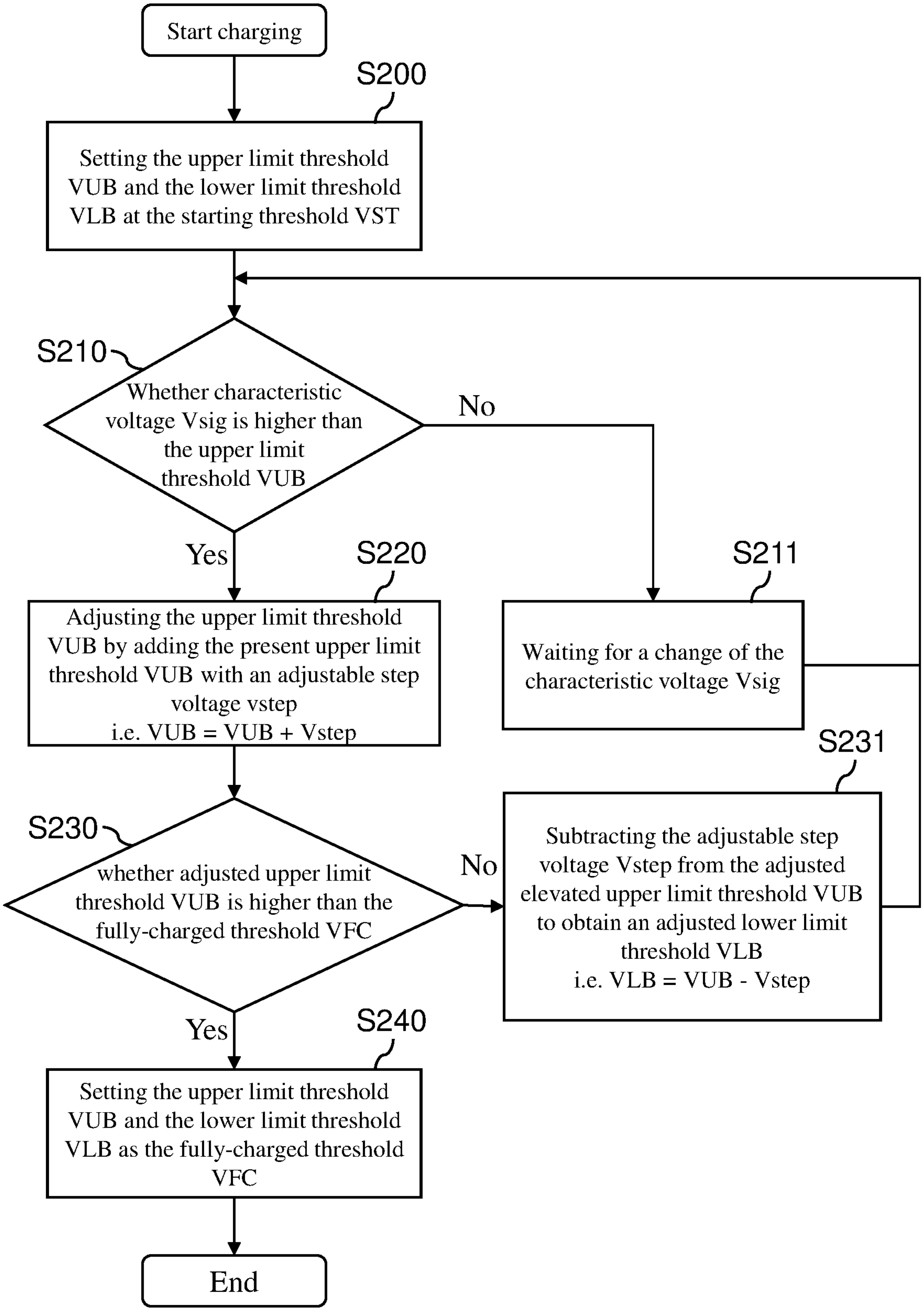
FIG. 4B shows a flow chart diagram depicting an operation procedure of a control unit according to an embodiment of the present invention.

Please refer to FIG. 4A along with FIG. 4B. FIG. 4A shows a schematic diagram depicting levels of respective voltages in a battery balancing system according to an embodiment of the present invention. FIG. 4B shows a flow chart diagram depicting an operation procedure of the control unit 130 according to an embodiment of the present invention. In this embodiment, the at least one threshold voltage includes an upper limit threshold VUB and a lower limit threshold VLB. As shown in FIG. 4A and FIG. 4B, when the battery balancing system 100 starts charging the battery group 200, the control unit 130 sets the upper limit threshold VUB and the lower limit threshold VLB at the starting threshold VST (step S200) and the control unit 130 determines whether the characteristic voltage Vsig is higher than the upper limit threshold VUB (step S210). If the characteristic voltage Vsig is higher than the upper limit threshold VUB, a threshold voltage adjustment starts (starting the adjustment stage). If the characteristic voltage Vsig is not higher than the upper limit threshold VUB, the control unit 130 will wait for a change of the characteristic voltage Vsig as the battery group 200 is being charged (step S211) and the control unit 130 will once again execute the step S210. If the result of the step S210 is yes, the control unit 130 will adjust the upper limit threshold VUB by adding the present upper limit threshold VUB with an adjustable step voltage Vstep (step S220). Next, the control unit 130 determines whether the adjusted upper limit threshold VUB is higher than a fully-charged threshold VFC (step S230). If the adjusted upper limit threshold VUB is not higher than the fully-charged threshold VFC, the control unit 130 will adjust the lower limit threshold VLB by subtracting the adjustable step voltage Vstep from the adjusted elevated upper limit threshold VUB, to obtain an adjusted lower limit threshold VLB (step S231). And, the control unit 130 will once again execute the step S210. If the result of the step S230 is yes, the control unit 130 will set the upper limit threshold VUB and the lower limit threshold VLB as the fully-charged threshold VFC (step S240) and the adjustment stage ends. That is, in this case, the threshold voltage will no longer be adjusted (i.e., each of the upper limit threshold VUB and the lower limit threshold VLB becomes a constant).

Figure 5A:
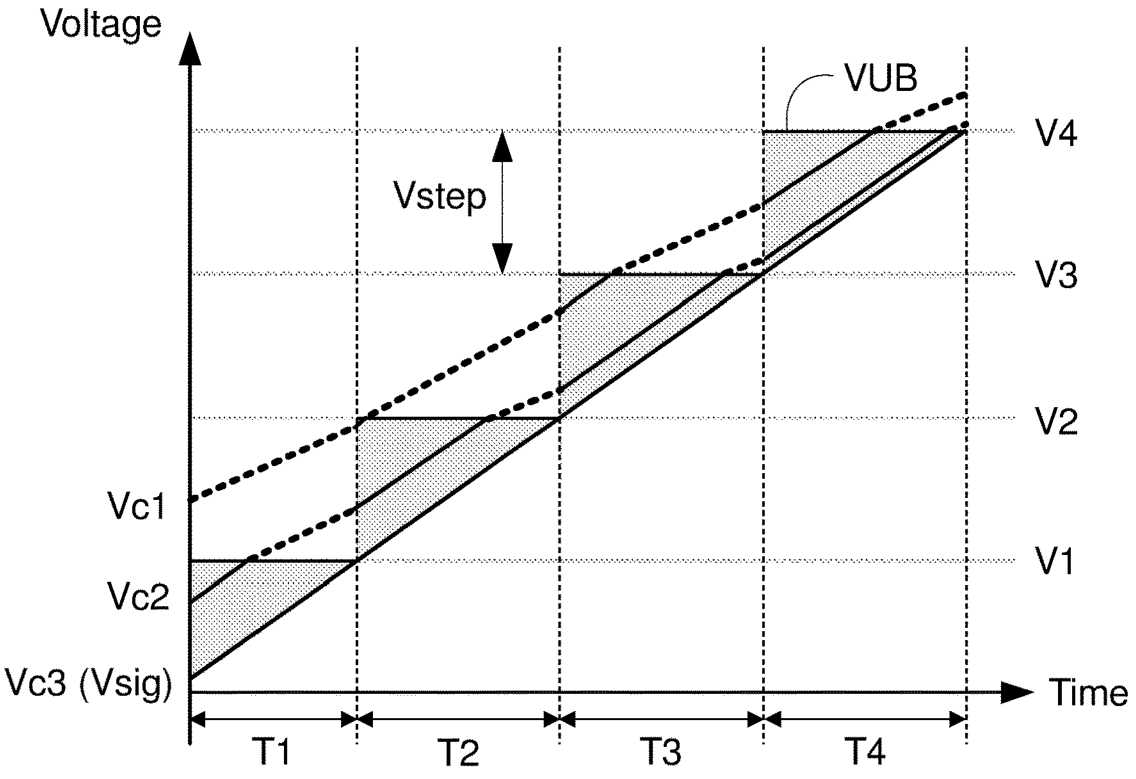
FIG. 5A to FIG. 5D respectively show waveforms of the battery voltage sensing signal when a battery is being charged according to several embodiments of the present invention.

Please refer to FIG. 5A to FIG. 5D. FIG. 5A to FIG. 5D show waveforms of the battery voltage sensing signals Vc1-Vc3 when a battery group 200 is being charged and when batteries 201, 202 and 203 are in a balance operation mode, according to several embodiments of the present invention. As shown in FIG. 5A, in this embodiment, the battery balancing system 100 only operates in a charge removal battery balancing approach, so the characteristic voltage Vsig is set as the lowest battery voltage sensing signal (i.e., battery voltage sensing signals Vc3) of the battery voltage sensing signals Vc1-Vc3. And, in this embodiment, the at least one threshold voltage is one single threshold voltage (i.e., upper limit threshold VUB). When the characteristic voltage Vsig gradually increases to a level which is not lower than the upper limit threshold VUB, the control unit 130 adaptively elevates the upper limit threshold VUB. For example, during the interval T1, the upper limit threshold VUB corresponds to a voltage V1, wherein when the characteristic voltage Vsig gradually increases to reach the upper limit threshold VUB, the control unit 130 will add the upper limit threshold VUB with an adjustable step voltage Vstep, to elevate the upper limit threshold VUB to a voltage V2. Likewise, during the interval T2 (or the interval T3), the upper limit threshold VUB corresponds to the voltage V2 (or a voltage V3), wherein when the characteristic voltage Vsig gradually increases to reach the upper limit threshold VUB, the control unit 130 will once again add the upper limit threshold VUB with the adjustable step voltage Vstep, to elevate the upper limit threshold VUB to the voltage V3 (or a voltage V4).

Please refer to FIG. 5A. In this embodiment, when the waveform of each of the battery voltage sensing signals Vc1-Vc3 is in the dotted line segment, it indicates that the control unit 130 executes a charge removal balancing command on the corresponding battery. On the other hand, when the waveform of each of the battery voltage sensing signals Vc1-Vc3 is in the solid line segment, it indicates that the control unit 130 ceases executing the charge removal balancing command on the corresponding battery.

Note that, a transition region is defined by the characteristic voltage Vsig, the voltage V1, V2, V3 or V4, and the interval T1, T2, T3 or T4 as indicated by the grey area. And therefore, when the waveform of each of the battery voltage sensing signals Vc1-Vc3 is out of the transition region is shown in the dotted line segment, and when the waveform of each of the battery voltage sensing signals Vc1-Vc3 is inside the transition region is shown in the solid line segment.

Taking the battery voltage sensing signal Vc1 as an example (corresponding to the battery 201), during the interval T1 and the interval T2, because the difference between the battery voltage sensing signal Vc1 and the characteristic voltage Vsig is relatively large (the waveform of the battery voltage sensing signal Vc1 is out of the transition region), when the battery group 200 is still under charging, the control unit 130 executes a charge removal balancing command on the corresponding battery 201, so that the rising speed of the battery voltage sensing signal Vc1 become slower, whereby the battery voltage sensing signal Vc1 gradually approximates to the characteristic voltage Vsig. As time goes by, because the battery voltage sensing signal Vc1 has already gradually approximated to the characteristic voltage Vsig, during the interval T3 and the interval T4, the time during which the control unit 130 ceases executing the charge removal balancing command on the corresponding battery 201 becomes longer, whereby the battery voltage sensing signal Vc1 even more approximates to the characteristic voltage Vsig. Likewise, referring to the battery voltage sensing signal Vc2 (corresponding to the battery 202), as time goes by (from the interval T1 to the interval T4), the time during which the control unit 130 ceases executing the charge removal balancing command on the corresponding battery 202 becomes longer. In brief, when the difference between the battery voltage sensing signal and the characteristic voltage Vsig is relatively large, according to the present invention, the converging speed of the battery voltage sensing signal towards the characteristic voltage Vsig is accelerated; when the difference between the battery voltage sensing signal and the characteristic voltage Vsig is relatively small, according to the present invention, the converging speed of the battery voltage sensing signal towards the characteristic voltage Vsig is decelerated.

In one embodiment, the control unit 130 is configured to operably adjust the adjustable step voltage Vstep which is related to the transition region, further according to a battery model, wherein the battery model is correlated with one or more of the following parameters: charging/discharging current, voltage, temperature, internal resistance, electrical power capacity and/or aging degree of the battery group 200. That is, the control unit 130 is configured to operably select an optimum value of the adjustable step voltage Vstep according to respective states for the batteries 201-20N in the battery group 200, to enhance the battery balancing efficiency. In one embodiment, the value of the adjustable step voltage Vstep serves to decide a balancing strength factor corresponding to a voltage difference between a corresponding battery voltage sensing signal Vc1-VcN and the characteristic voltage Vsig. On one hand, when the adjustable step voltage Vstep is relatively larger, i.e. the transition region is relatively larger, the variation of the balancing strength factor corresponding to the aforementioned voltage difference is relatively weaker (i.e., the balancing strength factor is relatively weaker). The weaker balancing strength factor indicates less confidence to execute the charge removal balancing command because of less confidence of the battery voltage sensing signal Vc1 indicating an open-circuit voltage (OCV). On the other hand, when the adjustable step voltage Vstep is relatively smaller, i.e. the transition region is relatively smaller, the variation of the balancing strength factor corresponding to the aforementioned voltage difference is relatively stronger (i.e., the balancing strength factor is relatively stronger). The stronger balancing strength factor indicates more confidence to execute the charge removal balancing command because of more confidence of the battery voltage sensing signal Vc1 indicating the OCV.

Figure 5B:
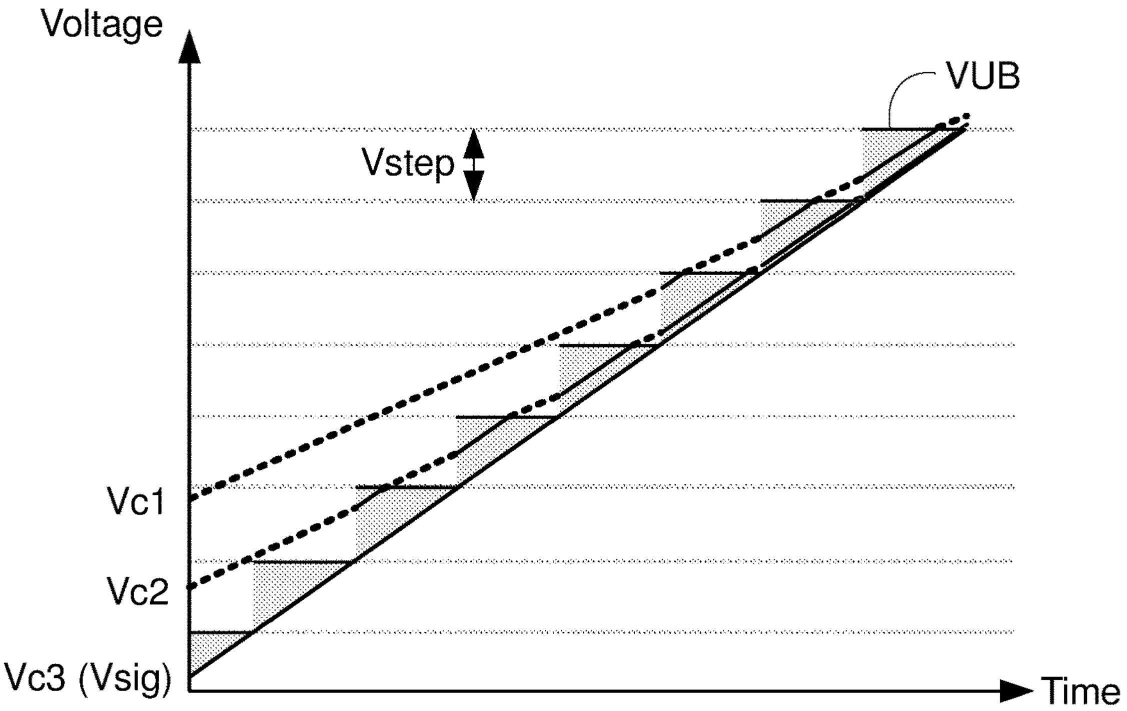

The embodiment in FIG. 5B is similar to the embodiment shown in FIG. 5A, but is different from FIG. 5A in that: the width of each step of adaptive adjustment of the upper limit threshold VUB (i.e., the adjustable step voltage Vstep) by the control unit 130 in FIG. 5B is different as compared to FIG. 5A, the adjustable step voltage Vstep in FIG. 5B is relatively smaller, i.e. the transition region is relatively smaller and balancing strength factor is relatively stronger, so the control unit 130 more frequently elevates the upper limit threshold VUB and judges the charge removal balancing command. The smaller the adjustable step voltage Vstep with the narrower transition region causes the battery voltage sensing signal with same voltage difference over the upper limit threshold VUB to have more time to execute the charge removal balancing command, to enhance the balancing effect. Consequently, in this case, the battery voltage sensing signals Vc1-Vc3 will approximate to the characteristic voltage Vsig even faster to reach a balance.

Figure 5C:
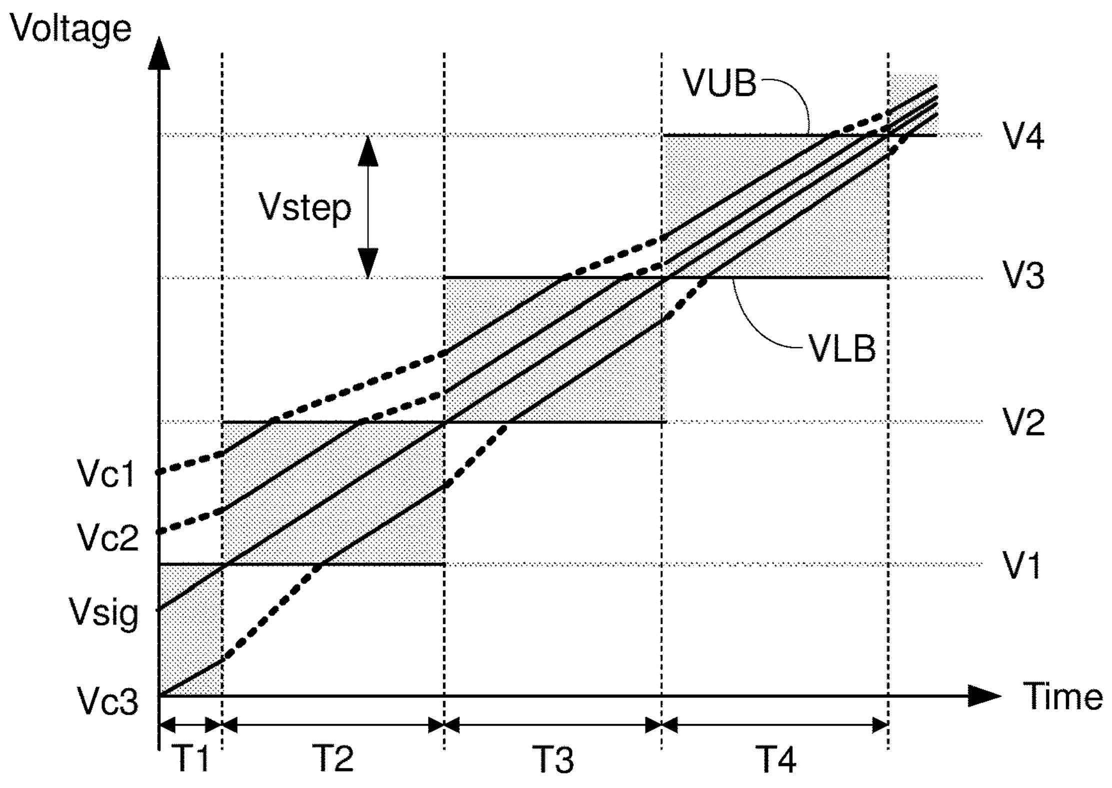

Referring to FIG. 5C, in this embodiment, the characteristic voltage selector 120 operates in a mixed battery balancing approach, so the characteristic voltage Vsig is set as an average voltage of the highest battery voltage sensing signal (i.e., battery voltage sensing signals Vc1) and the lowest battery voltage sensing signal (i.e., battery voltage sensing signals Vc3) of the battery voltage sensing signals Vc1-Vc3. Besides, in this embodiment, the at least one threshold voltage includes an upper limit threshold VUB and a lower limit threshold VLB, wherein the difference between the upper limit threshold VUB and the lower limit threshold VLB is the adjustable step voltage Vstep. And, the characteristic voltage Vsig lies between the upper limit threshold VUB and the lower limit threshold VLB. In one embodiment, in a case wherein the characteristic voltage Vsig gradually increases to a level which is not lower than the upper limit threshold VUB, the control unit 130 adaptively elevates the upper limit threshold VUB, and the control unit 130 subtracts the adjustable step voltage Vstep from the elevated upper limit threshold VUB to obtain the lower limit threshold VLB. For example, during the interval T2, the upper limit threshold VUB corresponds to the voltage V2 and the lower limit threshold VLB corresponds to the voltage V1, wherein when the characteristic voltage Vsig reaches the upper limit threshold VUB, the control unit 130 will elevate the upper limit threshold VUB to the voltage V3 and the control unit 130 will subtract the adjustable step voltage Vstep from the elevated upper limit threshold VUB to obtain the lower limit threshold VLB (corresponding to the voltage V2). Likewise, during the interval T3, the upper limit threshold VUB corresponds to the voltage V3 and the lower limit threshold VLB corresponds to the voltage V2, wherein when the characteristic voltage Vsig reaches the upper limit threshold VUB, the control unit 130 will elevate the upper limit threshold VUB to the voltage V4 and the control unit 130 will subtract the adjustable step voltage Vstep from the elevated upper limit threshold VUB to obtain the lower limit threshold VLB (corresponding to the voltage V3).

Please still refer to FIG. 5C. In this embodiment, when the waveform of each of the battery voltage sensing signals Vc1-Vc3 is outside the transition region and in the dotted line segment, it indicates that the control unit 130 executes a charge removal balancing command or a charge supplying balancing command on the corresponding battery. On the other hand, when the waveform of each of the battery voltage sensing signals Vc1-Vc3 is in the solid line segment, it indicates that the control unit 130 ceases executing the charge removal balancing command or the charge supplying balancing command on the corresponding battery. Taking the battery voltage sensing signal Vc1 as an example (corresponding to the battery 201), during the interval T1 and the interval T2, because the difference between the battery voltage sensing signal Vc1 and the characteristic voltage Vsig is relatively larger, and the battery voltage sensing signal Vc1 is higher than the upper limit threshold VUB, the time during which the control unit 130 executes the charge removal balancing command on the corresponding battery 201 is longer, so that the rising speed of the battery voltage sensing signal Vc1 become slower, whereby the battery voltage sensing signal Vc1 gradually approximates to the characteristic voltage Vsig. As time goes by, because the battery voltage sensing signal Vc1 has already gradually approximated to the characteristic voltage Vsig, during the interval T3 and the interval T4, the time during which the control unit 130 ceases executing the charge removal balancing command on the corresponding battery 201 becomes longer, so as to prevent the rising speed of the battery voltage sensing signal Vc1 from becoming excessively slow.

Taking the battery voltage sensing signal Vc3 as another example (corresponding to the battery 203), during the interval T1 and the interval T2, because the difference between the battery voltage sensing signal Vc3 and the characteristic voltage Vsig is relatively large, and the battery voltage sensing signal Vc3 is lower than the lower limit threshold VLB, the time during which the control unit 130 executes the charge supplying balancing command on the corresponding battery 203 is longer, so that the rising speed of the battery voltage sensing signal Vc3 becomes faster, whereby the battery voltage sensing signal Vc3 gradually approximates to the characteristic voltage Vsig. As time goes by, because the battery voltage sensing signal Vc3 has already gradually approximated to the characteristic voltage Vsig, during the interval T3 and the interval T4, the time during which the control unit 130 ceases executing the charge supplying balancing command on the corresponding battery 203 becomes longer, so as to prevent the rising speed of the battery voltage sensing signal Vc3 from becoming excessively fast.

Figure 5D:
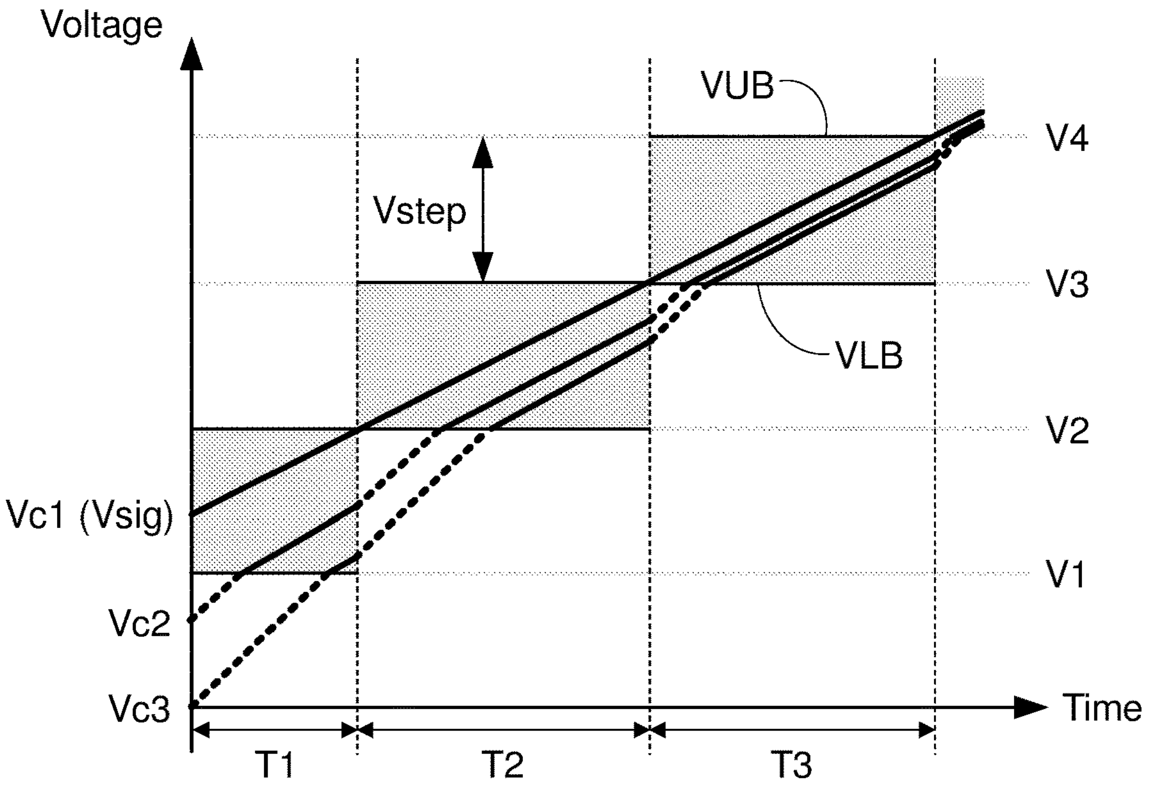

Referring to FIG. 5D, in this embodiment, because the characteristic voltage selector 120 operates in a charge supplying battery balancing approach, the characteristic voltage Vsig is set as the highest battery voltage sensing signal (i.e., battery voltage sensing signals Vc1) of the battery voltage sensing signals Vc1-Vc3. Besides, in this embodiment, the at least one threshold voltage includes an upper limit threshold VUB and a lower limit threshold VLB, wherein the difference between the upper limit threshold VUB and the lower limit threshold VLB is the adjustable step voltage Vstep. And, the characteristic voltage Vsig lies between the upper limit threshold VUB and the lower limit threshold VLB. In one embodiment, in a case wherein the characteristic voltage Vsig gradually increases to a level which is not lower than the upper limit threshold VUB, the control unit 130 adaptively elevates the upper limit threshold VUB, and the control unit 130 subtracts the adjustable step voltage Vstep from the elevated upper limit threshold VUB to obtain the lower limit threshold VLB. For example, during the interval T1, the upper limit threshold VUB corresponds to the voltage V2 and the lower limit threshold VLB corresponds to the voltage V1, wherein when the characteristic voltage Vsig reaches the upper limit threshold VUB, the control unit 130 will elevate the upper limit threshold VUB to the voltage V3 and the control unit 130 subtracts the adjustable step voltage Vstep from the elevated upper limit threshold VUB (i.e., the voltage V3) to obtain the lower limit threshold VLB (corresponding to the voltage V2). Likewise, during the interval T2, the upper limit threshold VUB corresponds to the voltage V3 and the lower limit threshold VLB corresponds to the voltage V2, wherein when the characteristic voltage Vsig reaches the upper limit threshold VUB, the control unit 130 will elevate the upper limit threshold VUB to the voltage V4 and the control unit 130 subtracts the adjustable step voltage Vstep from the elevated upper limit threshold VUB (i.e., the voltage V4) to obtain the lower limit threshold VLB (corresponding to the voltage V3).

Please still refer to FIG. 5D. In this embodiment, when the waveform of each of the battery voltage sensing signals Vc1-Vc3 is in the dotted line segment, it indicates that the control unit 130 executes a charge supplying balancing command on the corresponding battery. On the other hand, when the waveform of each of the battery voltage sensing signals Vc1-Vc3 is in the solid line segment, it indicates that the control unit 130 ceases executing the charge supplying balancing command on the corresponding battery. Taking the battery voltage sensing signal Vc3 as an example (corresponding to the battery 203), during the interval T1, because the difference between the battery voltage sensing signal Vc3 and the characteristic voltage Vsig is relatively large, the time during which the control unit 130 executes the charge supplying balancing command on the corresponding battery 203 is relatively longer, so that the rising speed of the battery voltage sensing signal Vc3 become relatively faster, whereby the battery voltage sensing signal Vc3 gradually approximates to the characteristic voltage Vsig. As time goes by, because the battery voltage sensing signal Vc3 has already gradually approximated to the characteristic voltage Vsig, during the interval T2 and the interval T3, the time during which the control unit 130 ceases executing the charge supplying balancing command on the corresponding battery 203 becomes longer, so as to prevent the rising speed of the battery voltage sensing signal Vc3 from becoming excessively fast. Likewise, taking the battery voltage sensing signal Vc2 as another example (corresponding to the battery 202), as time goes by (from the interval T1 to the interval T3), the time during which the control unit 130 ceases executing the charge supplying balancing command on the corresponding battery 202 becomes longer.

Figure 6:
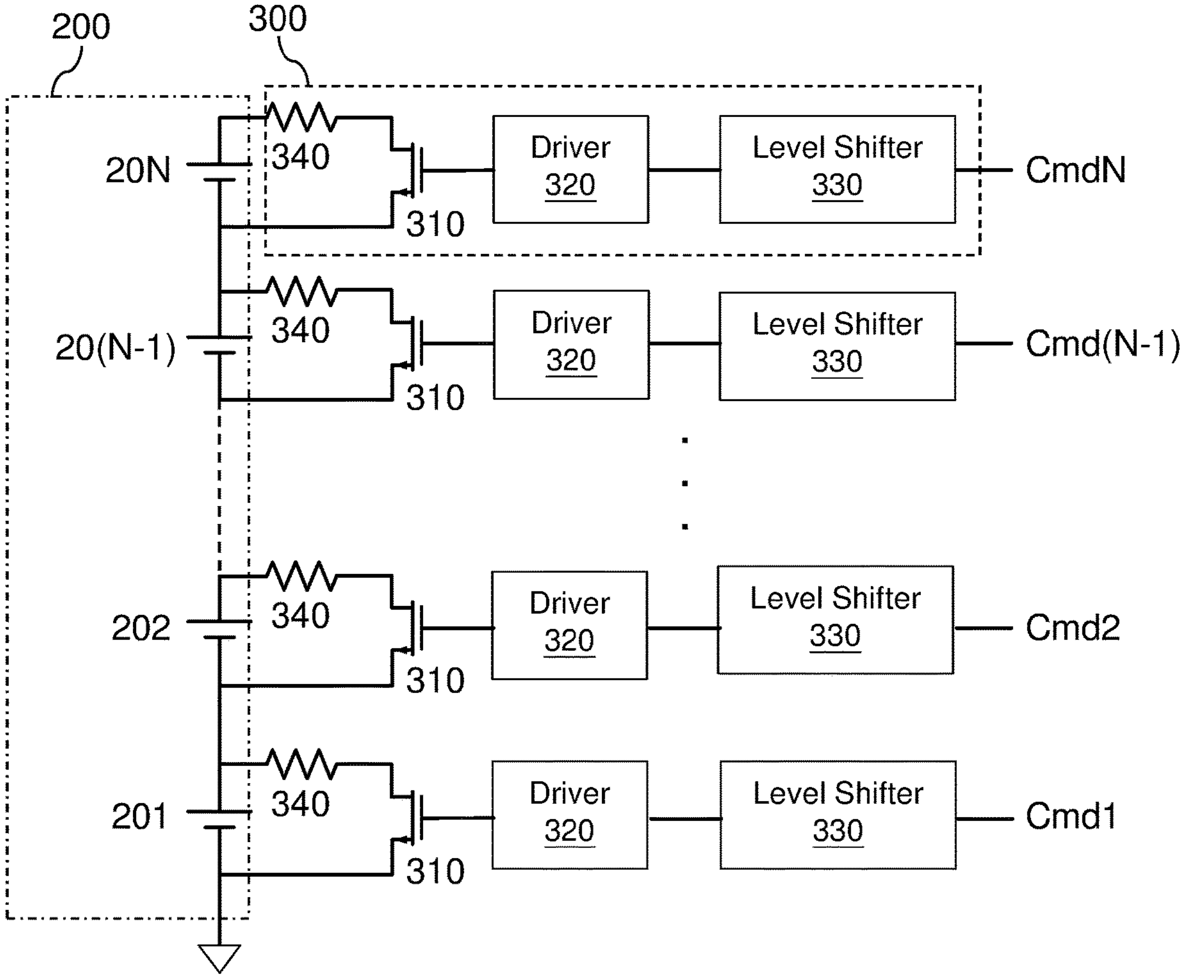
FIG. 6 shows a schematic circuit diagram of a charge removal operation structure according to an embodiment of the present invention.

In one embodiment, when the characteristic voltage selector 120 operates in a charge removal battery balancing approach, the control unit 130 reduces the quantity of the charges stored in the batteries 201-20N of the battery group 200. Please refer to FIG. 6, which shows a schematic circuit diagram of a discharging circuit 300 according to an embodiment of the present invention. As shown in FIG. 6, each battery in the batteries 201-20N includes a corresponding discharging circuit 300, wherein each discharging circuit 300 includes: a switch 310, a driver 320 and a level shifter 330. In one embodiment, the discharging circuit 300 controls the switch 310 via the driver 320, to decide whether to electrically connect the positive end and negative end of a corresponding battery in the batteries 201-20N, for discharging the charges in the corresponding battery, wherein each discharging circuit 300 further includes a current limitation resistor 340. In one embodiment, the level shifter 330 is configured to operably adjust the voltage level of a corresponding battery balancing command Cmd1-CmdN to a voltage level of a corresponding battery in the batteries 201-20N, so that each battery balancing command Cmd1-CmdN is adjusted to be able to independently control a corresponding switch 310 of a corresponding battery in the batteries 201-20N, whereby each battery is independently discharged.

Figure 7:
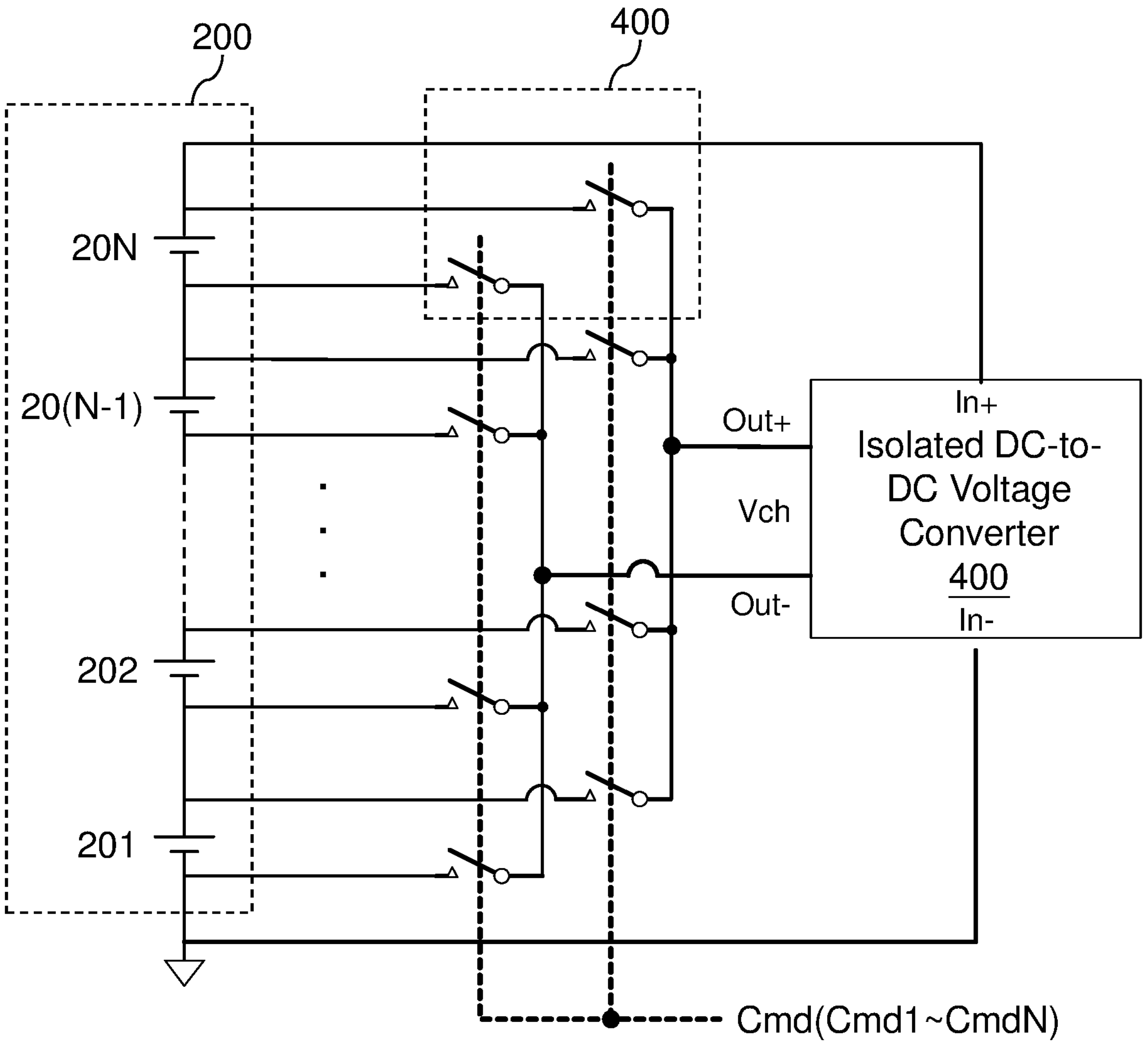
FIG. 7 shows a schematic circuit diagram of a charge supplying operation structure according to an embodiment of the present invention.

In one embodiment, when the characteristic voltage selector 120 operates in a charge supplying battery balancing approach, the control unit 130 increases the quantity of the charges stored in the batteries 201-20N of the battery group 200. Please refer to FIG. 7, which shows a schematic circuit diagram of a battery group 200 according to an embodiment of the present invention. As shown in FIG. 7, the voltage of each battery in the batteries 201-20N is converted to a charging voltage Vch via an isolated DC-to-DC voltage converter 400, and the control unit 130 selects one battery to be charged via one of the corresponding battery balancing commands Cmd (i.e., Cmd1-CmdN), so that the charging voltage Vch generated by the isolated DC-to-DC voltage converter 400 charges the selected battery. The structure and the function of an isolated DC-to-DC voltage converter 400 are well known to those skilled in the art, so the details thereof are not redundantly explained here.

Note that, according to the present invention, the control unit 130 can also select plural batteries to be charged via the corresponding battery balancing commands Cmd, if there are corresponding isolated DC-to-DC voltage converters 400 (not shown in FIG. 7) coupled to the batteries respectively.

In one embodiment, a starting time point of the balance operation mode is correlated with a time point at which each battery voltage sensing signal is not lower than a starting threshold VST. The balance operation mode includes a threshold voltage adjustment termination time point, wherein the threshold voltage adjustment termination time point is correlated with a time point at which the at least one threshold voltage is not lower than a fully-charged threshold VFC. Subsequent to the threshold voltage adjustment termination time point, the threshold voltage will no longer be adjusted, but the selection of the characteristic voltage Vsig can end or continue. That is, even though the threshold voltage adjustment is terminated, the selection of the characteristic voltage Vsig can continue, or can be terminated. In addition, subsequent to the threshold voltage adjustment termination time point, the threshold voltage will no longer be adjusted, but a balancing operation on the corresponding battery will continue being executed. That is, subsequent to the threshold voltage adjustment termination time point, the battery balancing system 100 remains operating in a balance operation mode, to decide the battery balancing commands Cmd1-CmdN, so as to execute a charge removal balancing command or a charge supplying balancing command on the corresponding battery, or so as to cease executing the charge removal balancing command or cease executing the charge supplying balancing command on the corresponding battery.

In light of above, the battery balancing system 100 of the present invention can dynamically adjust at least one threshold voltage for balancing the battery by deciding a characteristic voltage Vsig. Besides, the battery balancing system 100 of the present invention can determine whether a battery is required to be balanced by comparing the at least one threshold voltage with a corresponding battery voltage sensing signal of that battery. Advantages of the present invention include: that the present invention can cover a relatively broader operation scope of a battery voltage sensing signal; and that the present invention can enhance the balancing strength corresponding to a battery whose corresponding battery voltage sensing signal has a larger difference with the characteristic voltage Vsig, and/or lessen the balancing strength corresponding to a battery whose corresponding battery voltage sensing signal has a smaller difference with the characteristic voltage Vsig, whereby the battery balancing control method according to the present invention can have an improved efficiency and better stability.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A battery balancing system, comprising:

a voltage sensing unit, which is configured to operably sense a battery voltage of each of a plurality of batteries connected in series in a battery group and generate a plurality of corresponding battery voltage sensing signals;

a characteristic voltage selector, which is configured to operably generate a characteristic voltage according to the plurality of battery voltage sensing signals; and a control unit, which is configured to operably compare the characteristic voltage with at least one threshold voltage in a balance operation mode, to adaptively adjust the at least one threshold voltage to generate at least one adjusted threshold voltage, and which is configured to operably compare at least one of the battery voltage sensing signals with the at least one adjusted threshold voltage to generate a battery balancing command, thereby executing a charge removal balancing command or a charge supplying balancing command on the corresponding battery, or thereby ceasing executing the charge removal balancing command or ceasing executing the charge supplying balancing command on the corresponding battery;

wherein the characteristic voltage is a single voltage derived from the plurality of battery voltage sensing signals, and the characteristic voltage selector is operable in one of a plurality of battery balancing approaches.

2. The battery balancing system of claim 1, wherein when the characteristic voltage selector only operates in a charge removal battery balancing approach, the characteristic voltage is correlated with a lowest battery voltage sensing signal of the plurality of battery voltage sensing signals.

3. The battery balancing system of claim 2, wherein the at least one threshold voltage is one single threshold voltage, wherein in a case wherein the characteristic voltage is not lower than the threshold voltage, the threshold voltage is adaptively elevated by adding the characteristic voltage with an adjustable step voltage.

4. The battery balancing system of claim 1, wherein when the characteristic voltage selector only operates in a charge supplying battery balancing approach, the characteristic voltage is correlated with a highest battery voltage sensing signal of the plurality of battery voltage sensing signals.

5. The battery balancing system of claim 4, wherein the at least one threshold voltage includes: an upper limit threshold and a lower limit threshold, wherein a difference between the upper limit threshold and the lower limit threshold is an adjustable step voltage, and wherein the characteristic voltage lies between the upper limit threshold and the lower limit threshold;

wherein when the battery voltage sensing signal is lower than the lower limit threshold, the control unit decides that the corresponding battery balancing command is to execute the charge supplying balancing command on the corresponding battery;

wherein when the battery voltage sensing signal lies between the upper limit threshold and the lower limit threshold, the control unit decides that the corresponding battery balancing command is to cease executing the charge removal balancing command or cease executing the charge supplying balancing command on the corresponding battery.

6. The battery balancing system of claim 5, wherein in a case wherein the characteristic voltage is not lower than the upper limit threshold, the control unit adaptively elevates the upper limit threshold.

7. The battery balancing system of claim 6, wherein in the case wherein the characteristic voltage is not lower than the upper limit threshold, the control unit subtracts the adjustable step voltage from the elevated upper limit threshold to obtain the lower limit threshold.

8. The battery balancing system of claim 1, wherein when the characteristic voltage selector operates in a mixed battery balancing approach, the characteristic voltage lies between the highest battery voltage sensing signal and the lowest battery voltage sensing signal of the plurality of battery voltage sensing signals, wherein the mixed battery balancing approach includes: a charge removal battery balancing approach and a charge supplying battery balancing approach.

9. The battery balancing system of claim 8, wherein the characteristic voltage is an average voltage of the highest battery voltage sensing signal and the lowest battery voltage sensing signal of the plurality of battery voltage sensing signals.

10. The battery balancing system of claim 8, wherein the characteristic voltage is set so that a time required by the characteristic voltage to supply charges to the corresponding battery is substantially the same as a time required by the characteristic voltage to remove charges from the corresponding battery.

11. The battery balancing system of claim 8, wherein the at least one threshold voltage includes: an upper limit threshold and a lower limit threshold, wherein a difference between the upper limit threshold and the lower limit threshold is an adjustable step voltage, and wherein the characteristic voltage lies between the upper limit threshold and the lower limit threshold;

wherein when the battery voltage sensing signal is higher than the upper limit threshold, the control unit decides that the corresponding battery balancing command is to execute the charge removal balancing command on the corresponding battery;

wherein when the battery voltage sensing signal is lower than the lower limit threshold, the control unit decides that the corresponding battery balancing command is to execute the charge supplying balancing command on the corresponding battery;

wherein when the battery voltage sensing signal lies between the upper limit threshold and the lower limit threshold, the control unit decides that the corresponding battery balancing command is to cease executing the charge removal balancing command or cease executing the charge supplying balancing command on the corresponding battery.

12. The battery balancing system of claim 11, wherein in a case wherein the characteristic voltage is not lower than the upper limit threshold, the control unit adaptively elevates the upper limit threshold.

13. The battery balancing system of claim 12, wherein in the case wherein the characteristic voltage is not lower than the upper limit threshold, the control unit subtracts the adjustable step voltage from the elevated upper limit threshold to obtain the lower limit threshold.

14. The battery balancing system of claim 1, wherein the characteristic voltage selector is configured to operably generate the characteristic voltage further according to a battery model.

15. The battery balancing system of claim 1, wherein a starting time point of the balance operation mode is correlated with a time point at which each battery voltage sensing signal is not lower than a starting threshold, and wherein the balance operation mode includes a threshold voltage adjustment termination time point, wherein the threshold voltage adjustment termination time point is correlated with a time point at which the at least one threshold voltage is not lower than a fully-charged threshold.

16. The battery balancing system of claim 3, wherein the control unit is configured to operably adjust the adjustable step voltage further according to a battery model, wherein the battery model is correlated with one or more of the following parameters: charging/discharging current, voltage, temperature, internal resistance, capacity and/or aging degree of the battery group.

17. A battery balancing control method, comprising:

sensing a battery voltage of each of a plurality of batteries connected in series in a battery group to generate a plurality of corresponding battery voltage sensing signals;

generating a characteristic voltage according to the plurality of battery voltage sensing signals by operating in one of a plurality of battery balancing approaches, wherein the characteristic voltage is a single voltage derived from the plurality of battery voltage sensing signals; and comparing the characteristic voltage with at least one threshold voltage in a balance operation mode, to adaptively adjust the at least one threshold voltage to generate at least one adjusted threshold voltage, and comparing at least one of the battery voltage sensing signals with the at least one adjusted threshold voltage to generate a battery balancing command, thereby executing a charge removal balancing command or a charge supplying balancing command on the corresponding battery, or thereby ceasing executing the charge removal balancing command or ceasing executing the charge supplying balancing command on the corresponding battery.

18. The battery balancing control method of claim 17, wherein when only a charge removal battery balancing approach is operated, the characteristic voltage is correlated with a lowest battery voltage sensing signal of the plurality of battery voltage sensing signals.

19. The battery balancing control method of claim 18, wherein the at least one threshold voltage is one single threshold voltage, wherein the step for adaptively adjusting the at least one threshold voltage includes:

in a case wherein the characteristic voltage is not lower than the threshold voltage, the threshold voltage is adaptively elevated by adding the characteristic voltage with an adjustable step voltage.

20. The battery balancing control method of claim 17, wherein when only a charge supplying battery balancing approach is operated, the characteristic voltage is correlated with a highest battery voltage sensing signal of the plurality of battery voltage sensing signals.

21. The battery balancing control method of claim 20, wherein the at least one threshold voltage includes: an upper limit threshold and a lower limit threshold, wherein a difference between the upper limit threshold and the lower limit threshold is an adjustable step voltage, and wherein the characteristic voltage lies between the upper limit threshold and the lower limit threshold;

wherein when the battery voltage sensing signal is lower than the lower limit threshold, the corresponding battery balancing command is to execute the charge supplying balancing command on the corresponding battery;

wherein when the battery voltage sensing signal lies between the upper limit threshold and the lower limit threshold, the corresponding battery balancing command is to cease executing the charge removal balancing command or cease executing the charge supplying balancing command on the corresponding battery.

22. The battery balancing control method of claim 21, wherein the step for adaptively adjusting the at least one threshold voltage includes:

in a case wherein the characteristic voltage is not lower than the upper limit threshold, adaptively elevating the upper limit threshold.

23. The battery balancing control method of claim 22, wherein the step for adaptively adjusting the at least one threshold voltage includes:

subtracting the adjustable step voltage from the elevated upper limit threshold to obtain the lower limit threshold.

24. The battery balancing control method of claim 17, wherein when a mixed battery balancing approach is operated, the characteristic voltage lies between the lowest battery voltage sensing signal and the highest battery voltage sensing signal of the plurality of battery voltage sensing signals, wherein the mixed battery balancing approach includes: a charge removal battery balancing approach and a charge supplying battery balancing approach.

25. The battery balancing control method of claim 24, wherein the characteristic voltage is an average voltage of the highest battery voltage sensing signal and the lowest battery voltage sensing signal of the plurality of battery voltage sensing signals.

26. The battery balancing control method of claim 24, wherein the characteristic voltage is set so that a time required by the characteristic voltage to supply charges to the corresponding battery is substantially the same as a time required by the characteristic voltage to remove charges from the corresponding battery.

27. The battery balancing control method of claim 24, wherein the at least one threshold voltage includes: an upper limit threshold and a lower limit threshold, wherein a difference between the upper limit threshold and the lower limit threshold is an adjustable step voltage, and wherein the characteristic voltage lies between the upper limit threshold and the lower limit threshold;

wherein when the battery voltage sensing signal is higher than the upper limit threshold, the corresponding battery balancing command is to execute the charge removal balancing command on the corresponding battery;

wherein when the battery voltage sensing signal is lower than the lower limit threshold, the corresponding battery balancing command is to execute the charge supplying balancing command on the corresponding battery;

wherein when the battery voltage sensing signal lies between the upper limit threshold and the lower limit threshold, the corresponding battery balancing command is to cease executing the charge removal balancing command or cease executing the charge supplying balancing command on the corresponding battery.

28. The battery balancing control method of claim 27, wherein the step for adaptively adjusting the at least one threshold voltage includes:

in a case wherein the characteristic voltage is not lower than the upper limit threshold, adaptively elevating the upper limit threshold.

29. The battery balancing control method of claim 28, wherein the step for adaptively adjusting the at least one threshold voltage includes:

subtracting the adjustable step voltage from the elevated upper limit threshold to obtain the lower limit threshold.

30. The battery balancing control method of claim 17, further comprising:

generating the characteristic voltage further according to a battery model.

31. The battery balancing control method of claim 17, wherein a starting time point of the balance operation mode is correlated with a time point at which each battery voltage sensing signal is not lower than a starting threshold, and wherein the balance operation mode includes a threshold voltage adjustment termination time point, wherein the threshold voltage adjustment termination time point is correlated with a time point at which the at least one threshold voltage is not lower than a fully-charged threshold.

32. The battery balancing control method of claim 21, wherein the adjustable step voltage is adjusted further according to a battery model, wherein the battery model is correlated with one or more of the following parameters: charging/discharging current, voltage, temperature, internal resistance, capacity and/or aging degree of the battery group.

* * * * *